United States Patent
Lovelace

(10) Patent No.: US 7,107,405 B2
(45) Date of Patent: Sep. 12, 2006

(54) WRITING CACHED DATA TO SYSTEM MANAGEMENT MEMORY

(75) Inventor: John V. Lovelace, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/449,244

(22) Filed: May 30, 2003

(65) Prior Publication Data

US 2004/0243766 A1 Dec. 2, 2004

(51) Int. Cl.
*G06F 12/00* (2006.01)

(52) U.S. Cl. .................. 711/133; 711/135; 711/143; 711/144; 711/113

(58) Field of Classification Search ........... 711/133, 711/135, 143, 113, 144
See application file for complete search history.

(56) References Cited

U.S. PATENT DOCUMENTS

| | | | | |
|---|---|---|---|---|
| 5,544,344 | A * | 8/1996 | Frame | 711/144 |
| 5,559,966 | A * | 9/1996 | Cho et al. | 710/105 |
| 5,619,674 | A * | 4/1997 | Ikumi | 711/131 |
| 5,909,696 | A * | 6/1999 | Reinhardt et al. | 711/144 |
| 5,913,225 | A * | 6/1999 | Ohba et al. | 711/135 |
| 5,954,812 | A * | 9/1999 | Shiell et al. | 712/39 |
| 6,049,852 | A * | 4/2000 | Oba et al. | 711/145 |
| 6,457,135 | B1 * | 9/2002 | Cooper | 713/323 |
| 6,546,462 | B1 * | 4/2003 | Palanca et al. | 711/135 |
| 2003/0126349 | A1 * | 7/2003 | Nalawadi et al. | 711/2 |

* cited by examiner

*Primary Examiner*—Pierre Bataille
*Assistant Examiner*—Sheng-Jen Tsai
(74) *Attorney, Agent, or Firm*—Trop, Pruner & Hu, P.C.

(57) ABSTRACT

In one embodiment of the present invention, a method includes storing system management mode data in a cache of a system during a system management mode; and preventing the system from leaving the system management mode until the system management mode data is evicted from the cache.

21 Claims, 4 Drawing Sheets

WRITING CACHED DATA TO SYSTEM MANAGEMENT MEMORY

BACKGROUND

The present invention relates generally to operating a processor-based system outside of an operating system and, more particularly, to operations occurring in a system management mode of the system.

In modern computer systems, system management activities such as those associated with temperature, voltage, and front panel button monitoring may be performed by routines that operate transparently to the operating system. One example of such a mode is termed System Management Mode (SMM) and may be entered through activation of an external system interrupt pin which generates a System Management Interrupt (SMI). In response to an SMI, the SMM may handle the event with system management functions such as reduced power consumption, debugging, or hardware emulation.

System management functions may be performed independently of the operating system. Before handling a system management event, the processor's internal state may be saved to a separate, protected and dedicated memory space, referred to as SMM random access memory (SMRAM). Then, firmware may control product-specific hardware features.

Chipsets such as memory controller hubs (MCHs) and I/O Controller Hubs (ICHs) compatible with a so-called Intel Architecture (IA), such as an IA-32 processor available from Intel Corporation (Santa Clara, Calif.) support SMM and SMI. SMM provides an essential context for BIOS to implement system features and chipset workarounds. SMM also serves as the security context for features such as protected flash access.

Recent chipsets provide the capability to alias SMM memory to high address space (HSEG) above 1 megabytes (MB), and/or reserve additional SMM memory from the top of system memory (TSEG). While this capability allows basic input/output system (BIOS) to cache SMM memory for improved SMI performance, when write-back (WB) cache is used for SMM address space, the processor does not explicitly preserve its SMM context when that data is written to cache. Instead, the SMM context is sampled when cached data is written back to system memory. Thus memory writes that occur within SMM may appear to be outside SMM when the cache line is evicted. This presents a significant challenge for the MCH to determine whether the cached data should be written to SMM memory. While the MCH allows cache-line writes to SMM memory regardless of processor context or SMM memory configuration, several drawbacks exist including requiring extra logic in the MCH to handle cache-line writes differently than other SMM memory writes and reduced system reliability and security. Thus, a need exists to improve consistency and security of SMM memory.

DETAILED DESCRIPTION

In various embodiments of the present invention, software may ensure that modified SMM cache lines are written back to SMM memory before allowing the processor to leave the SMM context. In one embodiment such software may be resident in BIOS. In such manner, embodiments may ensure that modified SMM data is stored in SMRAM and that SMM secrets may be retained securely.

In certain embodiments, a Cache Line Flush instruction (CLFLUSH) may be used by BIOS to force a single cache-line eviction without affecting other cache contents. In such manner, performance degradation to non-SMM applications may be eliminated. That is, by evicting only desired cache lines, non-SMM cache contents may remain for use during normal system operation. Performance impact to SMI may also be minimized when SMM memory is structured to separate read-only code from read-write data.

In certain embodiments, secrets may be hidden in SMM memory which were present in cache space. In such manner, BIOS may hide sensitive information prior to exiting a SMM context. In one embodiment BIOS may use CLFLUSH to evict all cache lines containing SMM memory secrets before allowing the processor to leave the SMM context. Then, access control logic in the MCH may be used to block reads to SMM memory by non-SMM software.

Also, in certain embodiments the MCH may handle cache-line writes like any other SMM memory access to provide consistency to the SMM memory architecture. In such manner, SMM memory may be protected from modification by non-SMM software, allowing SMM memory usage to be more reliable and the SMM context more secure.

Figure 1:
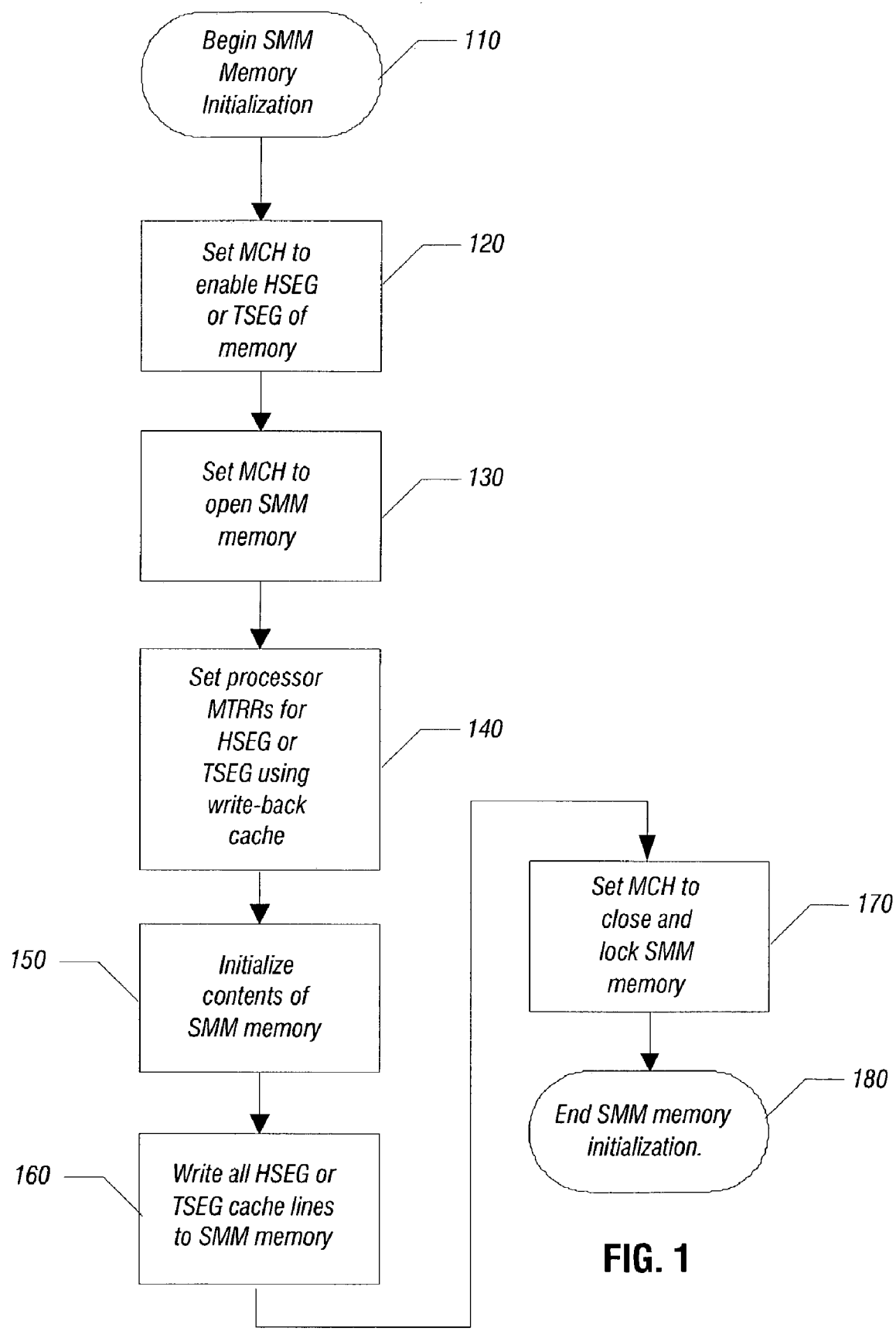
FIG. 1 is a flow diagram of an initialization method in accordance with one embodiment of the present invention.

Referring now to FIG. 1, shown is a flow diagram of an initialization method in accordance with one embodiment of the present invention. As shown in FIG. 1, a SMM memory initialization method may begin (block 110). First, the MCH may be set to enable HSEG or TSEG of memory (block 120). Next, the MCH may be set to open SMM memory (block 130). The processor may then be set for SMM memory present in HSEG or TSEG space using write-back cache (block 140). In one embodiment, the processor may be set by setting a memory type range, register (MTRR) for such a write-back caching scheme.

Next the contents of the SMM memory may be initialized (block 150). In one embodiment SMM code may be obtained (from a flash memory, for example), be decompressed and provided to SMM memory. Next, all HSEG or TSEG cache lines may be written to SMM memory (block 160). In one embodiment, a CLFLUSH instruction may be used to provide desired cache lines to SMM memory.

Alternately, in other embodiments a flush of the entire cache may be performed for example, using a Write Back and Invalidate Cache instruction (e.g. WBINVD). However, such a global flush may cause more significant latencies. In certain embodiments, cache contents need not be written to memory if caching is not enabled during SMM memory initialization.

The memory controller may then be set to close and lock the SMM memory (block 170). In one embodiment, SMM memory may be locked with a write-once lock bit for improved security. Finally, SMM memory initialization may be ended (block 180). In such manner, SMM memory may be initialized for runtime operations.

In certain embodiments, next a SMI relocation process may occur. In such an embodiment, a default SMI handler may be initialized for relocation. Further, the ICH may be set to enable the SMI source for relocation. Then a SMI may be generated to relocate each logical processor to a unique system management base address (SMBASE) in SMM memory. Finally, other SMI sources may be enabled for normal operation. In this manner, a memory range may be set so that a first SMI occurring during runtime may relocate to the desired memory location.

Figure 2:
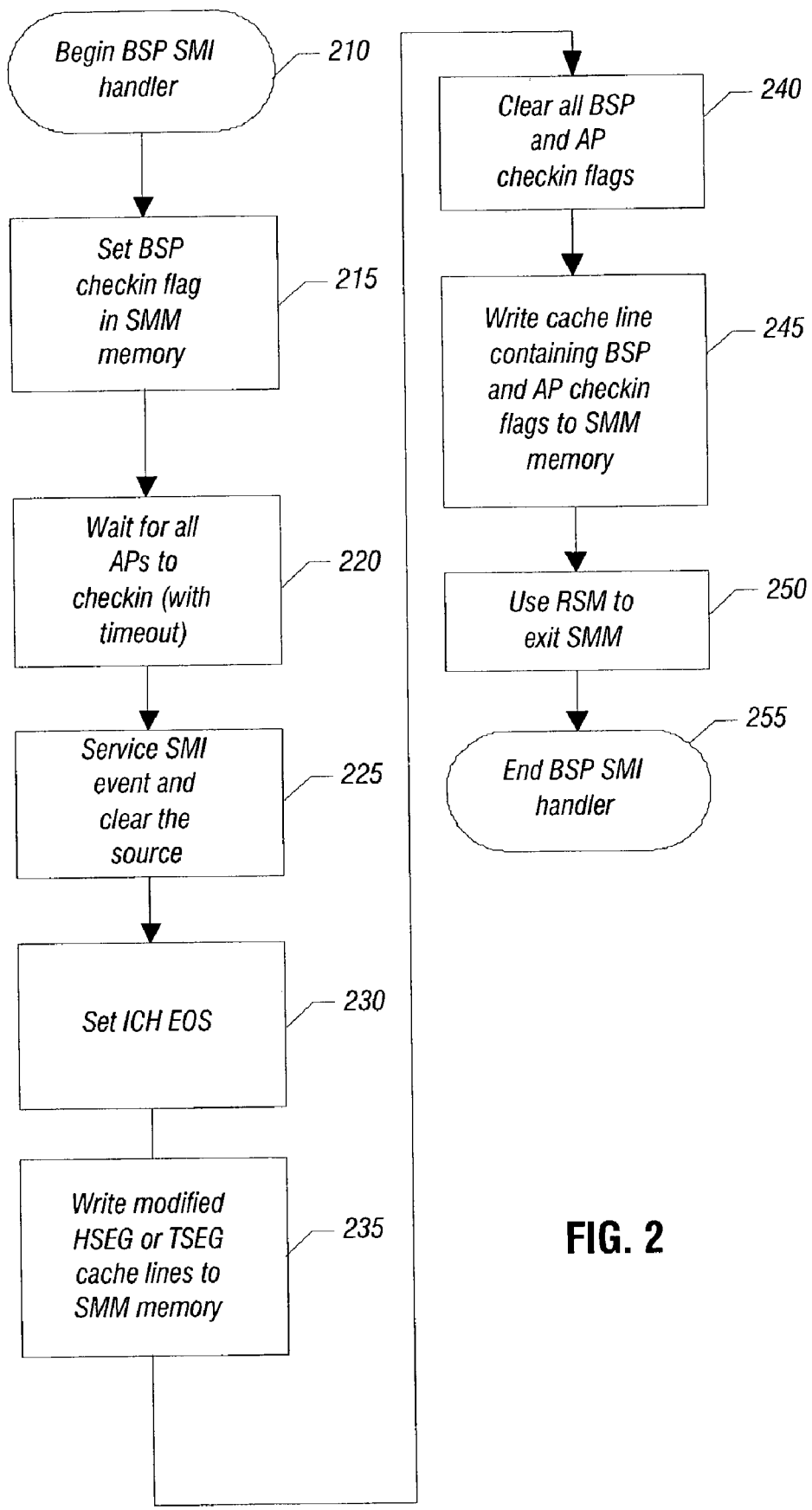
FIG. 2 is a flow diagram of a method in accordance with one embodiment of the present invention.
Figure 3:
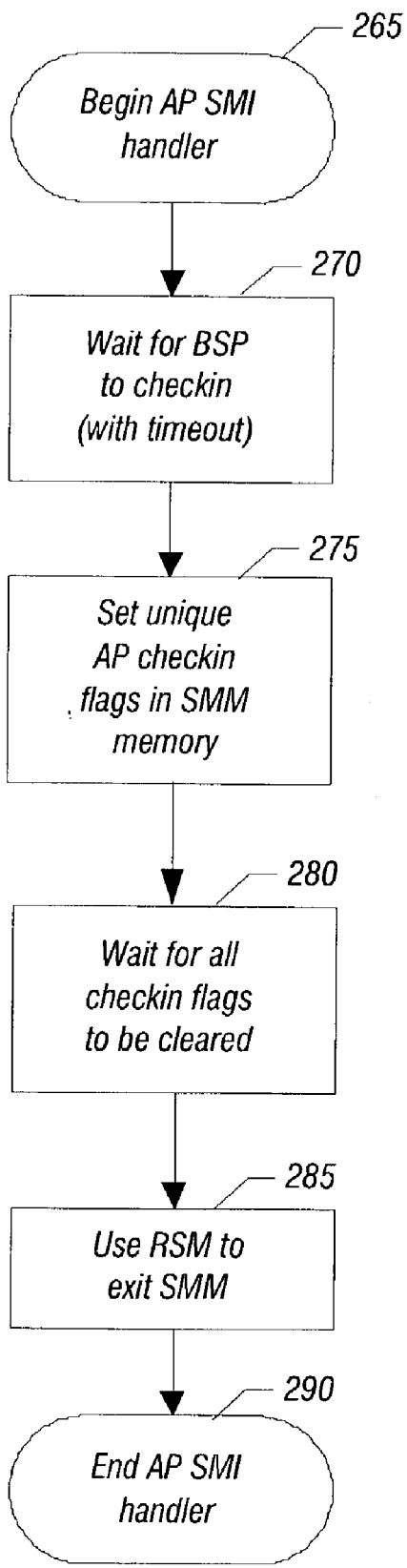
FIG. 3 is a flow diagram of a method in accordance with one embodiment of the present invention.

Referring now to FIG. 2, shown is a flow diagram of a method in accordance with one embodiment of the present invention. More specifically, shown in FIG. 2 is a flow diagram for a bootstrap processor (BSP) SMI handler. In certain embodiments, an applications processor (AP) SMI handler may begin concurrently with the BSP SMI handler (an example flow diagram thereof is shown in FIG. 3, discussed below).

As shown in FIG. 2, the BSP SMI handler may begin (block 210). First, a BSP check-in flag may be set in SMM memory (block 215). The BSP SMI handler may then wait for all APs to check in (with timeout) (block 220). In the embodiment of FIG. 2, no further activities in the BSP SMI handler may occur until all APs have checked in. Next the BSP SMI handler may service the SMI event and clear the source thereof (block 225). For example, the SMI event may be a power management action required by a notebook computer. After the SMI event has been serviced, an end of SMI (EOS) register in the ICH may be set (block 230). In such manner, the ICH may allow the next SMI (if present) to be latched.

Still referring to FIG. 2, next any modified HSEG or TSEG cache lines may be written to SMM memory (block 235). If no data was modified in the cache lines, such writing to SMM memory may not be required for a given SMI handler event. In one embodiment, a CLFLUSH instruction may be used to write the modified cache lines to SMM memory. However in other embodiments, a WBINVD instruction or other such instruction to invalidate and flush the cache may be used. Next, all BSP and AP check in flags may be cleared (block 240). In one embodiment, such flags may be placed into cache.

In certain embodiments, to optimize latencies, cache may be segregated into code and data portions. In such manner, only data portions need be written to SMM memory, thus reducing latencies. However, in embodiments in which SMM secrets are present in cache, writing all such cache lines to SMM memory may be performed to force secrets out of cache to prevent the secrets from being uncovered outside of SMM context.

Still referring to FIG. 2, the cache line or lines containing check-in flags may be written into SMM memory (block 245). In one embodiment, a CLFLUSH instruction may be used to write the desired line or lines to SMM memory. Alternately in other embodiments a WBINVD or other such instruction may be used. A Resume from System Management mode (RSM) instruction may be used to exit SMM (block 250), and the SMI handler may be terminated (block 255).

Concurrently with the BSP SMI handler, one or more ASP SMI handlers may also take place. Referring to FIG. 3, shown is a flow diagram of a BSP handler in accordance with one embodiment of the present invention. As shown in FIG. 3, an AP SMI handler may begin (block 265). The AP SMI handler may wait for the BSP to check in (with timeout) (block 270). In one embodiment, such check in may be via setting of a BSP check-in flag in SMM memory. Then the AP SMI handler may set a unique AP check-in flag in SMM memory (block 275). Such unique check-in flags may be set for each AP operating in the system.

Still referring to FIG. 3, after the BSP SMI handler services an SMI event and writes any modified SMM cache data to SMM memory, the AP SMI handler waits for all check-in flags to be cleared (block 280). In one embodiment, the various AP SMI handlers may look into SMM memory to see whether all of the check-in flags have been cleared by the BSP SMI handler. Then a RSM instruction may be used to exit from SMM (block 285), and the AP SMI may terminate (block 290).

While discussed above as being used in a system management mode, it is to be understood that other embodiments of the present invention may be used in other modes operating outside of and or transparent to a normal operating mode, such as may be available on other processor-based architectures. As used herein, such other modes may also be referred to as a "system management mode".

Embodiments may be implemented in a computer program. As such, these embodiments may be stored on a storage medium having stored thereon instructions which can be used to program a computer system, wireless device or the like to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Figure 4:
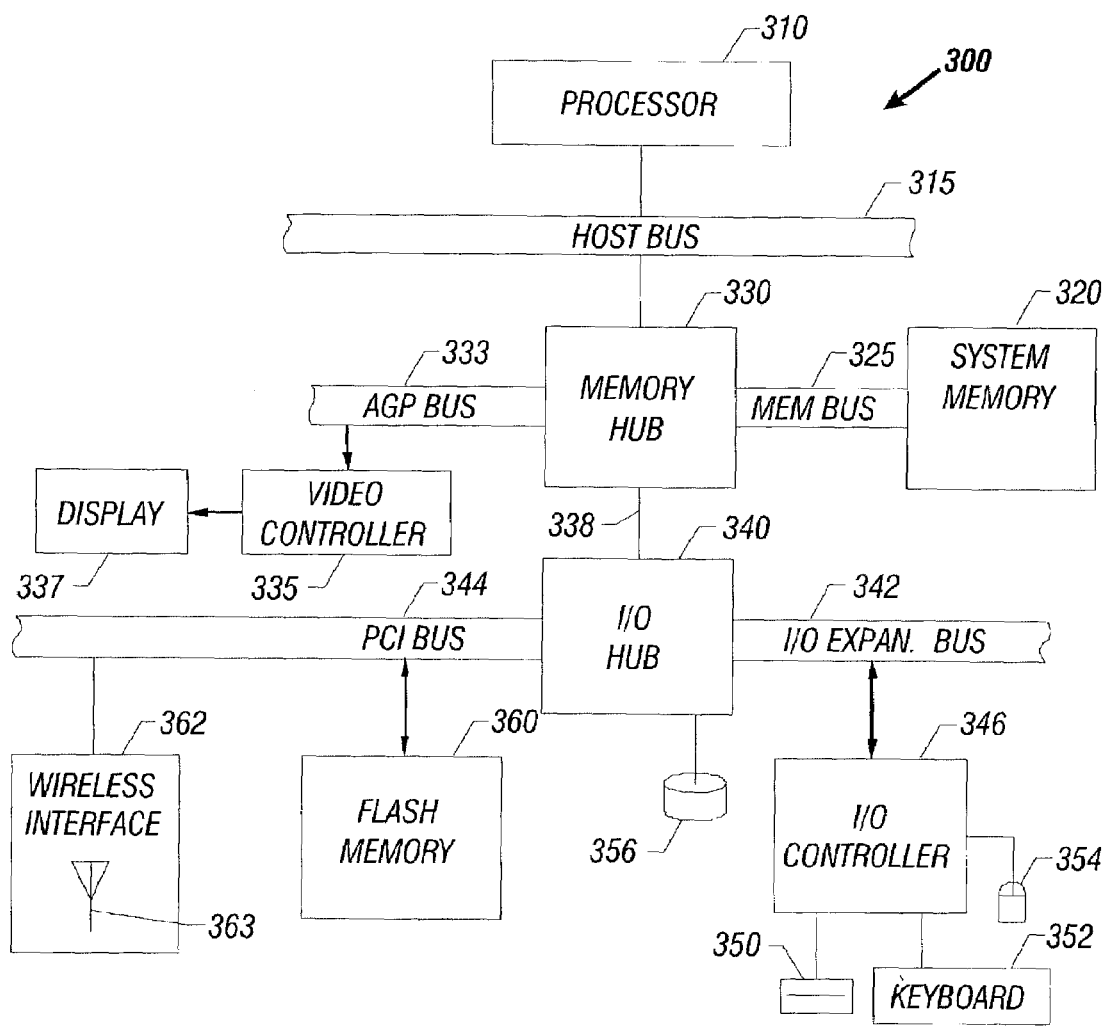
FIG. 4 is a block diagram of a processor-based system with which embodiments of the present invention may be used.

FIG. 4 is a block diagram of a representative data processing system, namely computer system 300, which may be a notebook computer, with which embodiments of the invention may be used. In one embodiment, computer system 300 includes a processor 310, which may include a general-purpose or special-purpose processor such as a microprocessor, microcontroller, application specific integrated circuit (ASIC), a programmable gate array (PGA), and the like.

The processor 310 may be coupled over a host bus 315 to a memory hub 330 in one embodiment, which may be coupled to a system memory 320 via a memory bus 325. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995, or alternately a bus such as the PCI Express bus, or another third generation I/O interconnect bus. The I/O expansion bus 342 may be coupled to an I/O controller 346 that controls access to one or more I/O devices. As shown in FIG. 4, these devices may include in one embodiment storage devices, such as a floppy disk drive 350 and input devices, such as keyboard 352 and mouse 354.

The I/O hub 340 may also be coupled to, for example, a hard disk drive 356 as shown in FIG. 4. It is to be understood that other storage media may also be included in the system. In an alternate embodiment, the I/O controller 346 may be integrated into the I/O hub 340, as may other control functions.

The PCI bus 344 may be coupled to various components including, for example, a flash memory 360. Further shown in FIG. 4 is a wireless interface 362 coupled to the PCI bus 344, which may be used in certain embodiments to communicate with remote devices. As shown in FIG. 4, wireless interface 362 may include a dipole or other antenna 363 (along with other components not shown in FIG. 4).

Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method comprising:
   entering a system management mode of a system;
   writing data to a cache line of a cache of the system while in the system management mode, the data corresponding to a flag for a handler of an applications processor system management mode; and
   writing back the cache line via a cache line flush instruction to send the single cache line to a system management memory while in the system management mode.

2. The method of claim 1, further comprising exiting the system management mode after writing back the cache line.

3. The method of claim 1, further comprising preventing access to the system management memory by non-system management mode software.

4. The method of claim 1, wherein writing back the cache line further comprises using a basic input output system to write back the cache line.

5. The method of claim 4, wherein writing back the cache line comprises evicting a system management mode memory secret from the cache.

6. The method of claim 4, further comprising preventing the system from exiting the system management mode prior to writing back the cache line via the basic input output system.

7. The method of claim 1, further comprising:
   writing back the cache line to a modifiable segment of the system management memory, the system management memory further comprising a non-modifiable segment.

8. The method of claim 1, further comprising servicing one or more system management interrupt events via a bootstrap processor system management mode handler after determining presence of the flag in the cache line for the handler of the applications processor system management mode.

9. A method comprising:
   writing information in a cache of a system via an applications processor system management handler to indicate presence of the applications processor system management handler;
   storing system management mode information in the cache during a system management mode, the system management mode information including the information;
   handling a system management event via a bootstrap processor system management handler; and
   preventing the system from leaving the system management mode until the system management mode information is evicted from the cache.

10. The method of claim 9, further comprising storing a system management mode secret in the cache.

11. The method of claim 9, wherein the cache comprises a write-back cache.

12. The method of claim 9, further comprising segmenting the cache into a read-only portion and a read-write portion.

13. The method of claim 9, further comprising preventing access to a system management memory outside of the system management mode.

14. A system comprising:
   a dynamic random access memory containing instructions that if executed enable the system to enter a system management mode, write data to a cache line of a cache while in the system management mode, the data corresponding to a flag for a handler of an applications processor system management mode, and write back the cache line via a cache line flush instruction to send the single cache line to a system management memory while in the system management mode; and
   a processor coupled to the dynamic random access memory to execute the instructions.

15. The system of claim 14, further comprising instructions that if executed enable the system to store a system management mode secret in the cache.

16. The system of claim 14, further comprising instructions that if executed enable the system to segment the cache into a read-only portion and a read-write portion.

17. An article comprising a machine-readable storage medium containing instructions that if executed enable a system to:
   determine if a plurality of handlers each corresponding to a different applications processor system management mode have communicated with a bootstrap processor system management handler;
   based on the determination, execute the bootstrap processor system management handler;
   clear a status flag for each of the plurality of handlers in one or more cache lines of a cache; and
   write the one or more cache lines including the status flags to a system management memory via a cache line flush instruction.

18. The article of claim 17, further comprising instructions that if executed enable the system to execute at least one of the plurality of handlers concurrently with the bootstrap processor system management handler.

19. The article of claim 17, further comprising instructions that if executed enable the system to clear the status flag via the bootstrap processor system management handler.

20. The article of claim 17, further comprising instructions that if executed enable the system to store a system management mode secret in the cache.

21. The article of claim 17, further comprising instructions that if executed enable the system to segment the cache into a read-only portion and a read-write portion.

* * * * *

UNITED STATES PATENT AND TRADEMARK OFFICE
CERTIFICATE OF CORRECTION

PATENT NO. : 7,107,405 B2 Page 1 of 1
APPLICATION NO. : 10/449244
DATED : September 12, 2006
INVENTOR(S) : John V. Lovelace It is certified that error appears in the above-identified patent and that said Letters Patent is hereby corrected as shown below:

Column 5:
Line 66, "infonnation" should be --information--.

Signed and Sealed this

Nineteenth Day of December, 2006

JON W. DUDAS
*Director of the United States Patent and Trademark Office*